(12) United States Patent
Fukumizu

(10) Patent No.: US 8,453,231 B2
(45) Date of Patent: May 28, 2013

(54) CERTIFICATION APPARATUS, CERTIFICATION SYSTEM AND CERTIFICATION METHOD

(75) Inventor: Makoto Fukumizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1770 days.

(21) Appl. No.: 11/278,717

(22) Filed: Apr. 5, 2006

(65) Prior Publication Data

US 2006/0251224 A1    Nov. 9, 2006

(30) Foreign Application Priority Data

Apr. 13, 2005 (JP) ................. 2005-115907

(51) Int. Cl.
*G06F 7/04* (2006.01)

(52) U.S. Cl.
USPC ............ 726/17; 726/4; 726/10; 713/151; 713/182

(58) Field of Classification Search
None
See application file for complete search history.

(56) References Cited

U.S. PATENT DOCUMENTS 6,813,347 B2 * 11/2004 Baals et al. ............ 379/215.01
7,287,270 B2 * 10/2007 Kai ................................ 726/2

FOREIGN PATENT DOCUMENTS

| JP | 11-027750 | 1/1999 |
| JP | 2002-055955 | 2/2002 |
| JP | 2002-171252 | 6/2002 |

* cited by examiner

*Primary Examiner* — Kaveh Abrishamkar
(74) *Attorney, Agent, or Firm* — Fitzpatrick, Cella, Harper & Scinto

(57) ABSTRACT

A certification apparatus displays a telephone number at a predetermined timing in a certification procedure to cause a user to make a telephone call. The certification apparatus acquires the telephone number of a caller from a incoming call signal for a call to the displayed telephone number, and executes certification processing using the acquired telephone number.

24 Claims, 10 Drawing Sheets

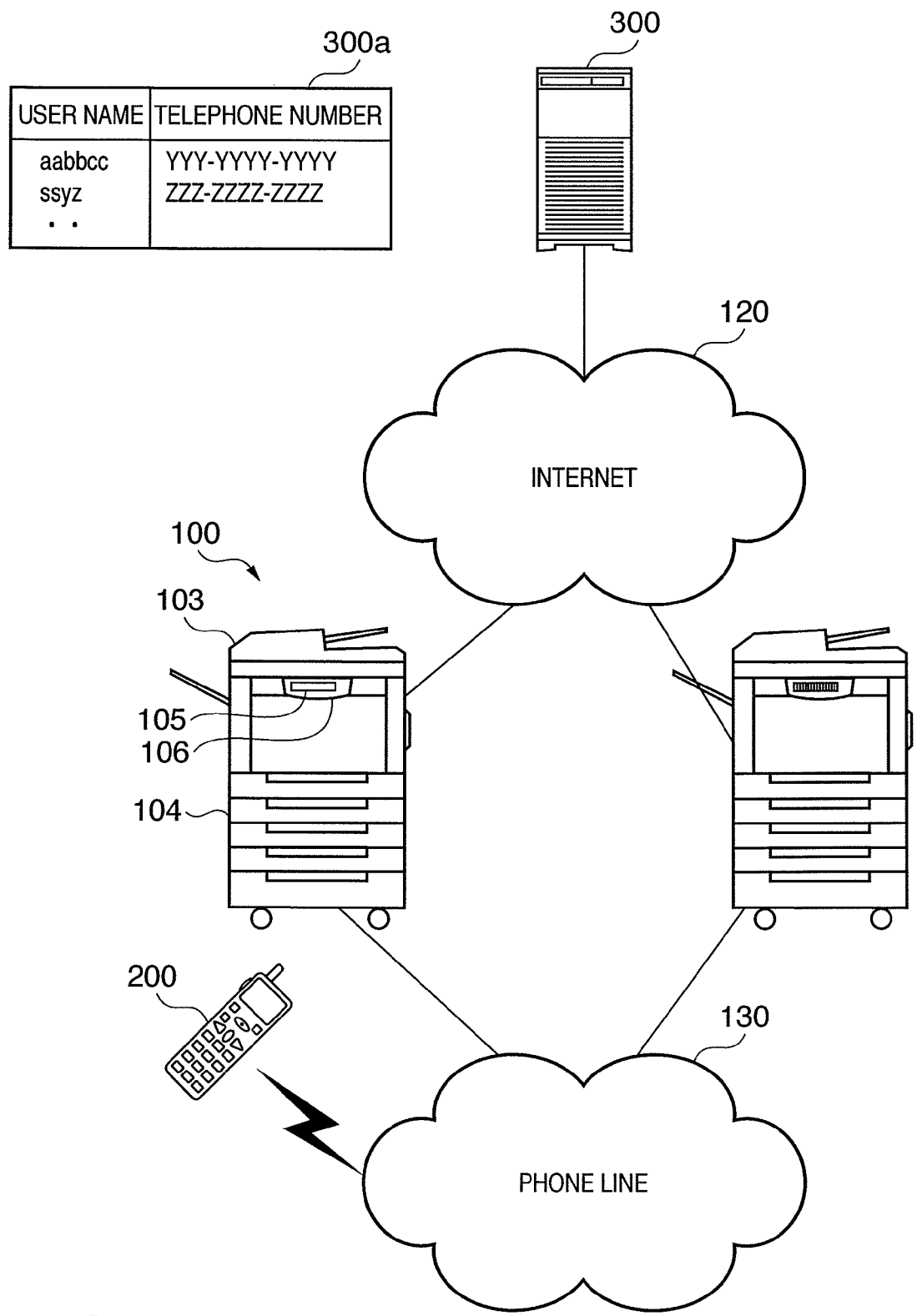
F I G. 2

CERTIFICATION APPARATUS, CERTIFICATION SYSTEM AND CERTIFICATION METHOD

FIELD OF THE INVENTION

The present invention relates to certification processing technology that is suitable for operations such as login to an information processing apparatus such as a server.

BACKGROUND OF THE INVENTION

Various technologies have been proposed regarding a configuration for performing certification with respect to a remote device. Japanese Patent Laid-Open No. 11-027750 describes problems relating to certification when connecting to a network from a mobile terminal such as a mobile phone. More specifically, it describes problems in a configuration that performs certification of a user using a user name and a password (PAP certification method) or a configuration that certifies the identity of a user on the basis of a connection to a certification IC card that the user possesses (IC card security method).

According to Japanese Patent Laid-Open No. 11-027750, the PAP certification method does not select the terminal which the user possesses. Therefore, in a case where the user name and password are leaked or stolen by another person, a person other than the actual user can easily access to a network from any other kind of terminal. Accordingly, Japanese Patent Laid-Open No. 11-027750 describes that a problem with the PAP certification method is that unauthorized connections cannot be effectively prevented.

Therefore, in order to solve this kind of security problem Japanese Patent Laid-Open No. 11-027750 discloses the use of a caller ID service for certification.

A caller ID service is a service that is provided to a user by the communication common carrier that provides the communication line. According to this service, when a call is made to an arbitrary telephone number from a mobile terminal such as a mobile phone, a unique code and a caller ID request are automatically sent to the base station communicating with the mobile terminal. The base station or telephone switching network that received this information determines a caller telephone number that was associated with the unique code of the mobile terminal from a telephone number database that it originally holds. The base station or telephone switching network also performs line connection switching so as to connect to the telephone number of the connection destination, to thereby connect the telephone network to the telephone set that is the reception target. Then, by sending the caller telephone number to the telephone set that is the reception object, the telephone number of the mobile terminal is displayed on the telephone set that is the reception object. A prerequisite for receiving this caller ID service is that settings for receiving the service are made in the telephone set that is the reception object.

According to Japanese Patent Laid-Open No. 11-027750, when a user connects a PC that the user possesses to a network to perform data communication, a mobile terminal that is connected to the PC is utilized. Further, a user ID name, a password and the user's telephone number are previously registered as certification data in a communication device. When connecting to the network, first a phone call is made to a connection destination through the mobile terminal. Upon receiving access information including the mobile terminal's unique code via a relay station for the mobile terminal, a telephone switching network accesses a telephone number database of a communication common carrier. It then determines the telephone number of the mobile terminal based on the mobile terminal's unique code. Thereafter, it sends the thus-determined telephone number of the mobile terminal to a receiving base station via a telephone network. A communication device of the receiving base station in which the caller ID service is set can acquire the telephone number of the mobile terminal. Thereafter, a user ID and a password are sent from the mobile terminal.

The communication device compares the telephone number, user ID and password that were notified from the mobile terminal with a user ID, password and user telephone number that were previously registered. When all of these match, the communication device starts the network connection.

That is, the technology disclosed in Japanese Patent Laid-Open No. 11-027750 focuses on the fact that, fundamentally, the telephone number of a mobile terminal that a user possesses is never duplicated, and utilizes the telephone number as a certification key. More specifically, Japanese Patent Laid-Open No. 11-027750 discloses a configuration in which a mobile terminal connects via a phone line to a server that is connected to the phone line, and which uses a telephone number of the mobile phone in addition to a user name and password for login certification.

Further, Japanese Patent Laid-Open No. 2002-171252 describes a configuration which determines the existence or non-existence of a keyboard for entry of a user name and password, and when a keyboard exists the certification information is entered from the keyboard, and when there is no keyboard the certification information is entered from a magnetic card or the like. More specifically, a configuration is disclosed which appropriately uses a physical certification system in accordance with the existence or non-existence of a keyboard. For example, in an environment in which a certification server which previously stores user IDs and passwords, a PC, and a printer are connected to a network, user certification at the PC is carried out by entering a user ID and a password from a keyboard. Further, when user certification is also required at the printer that is connected to the same network as the PC, the user certification for the person executing the printing job is carried out by inserting a magnetic card into the printer.

When entering a user name and password as certification information, that is, in the case of the PAP certification method described in Japanese Patent Laid-Open No. 11-027750, since it is a simple certification procedure, it is difficult to prevent an uncertified person masquerading as a certified user. Meanwhile, when performing certification using a magnetic card or the like as described in Japanese Patent Laid-Open No. 2002-171252, a special magnetic card is required and this leaves much to be desired with respect to convenience. Furthermore, since the magnetic card itself is not protected, it is also difficult to prevent an uncertified person masquerading as a certified user.

In contrast, utilizing a telephone set ID service for certification as described in Japanese Patent Laid-Open No. 11-027750 is an effective method from the viewpoint of the high level of security relating to the ID and the diffusion thereof.

However, in the above described Japanese Patent Laid-Open No. 11-027750 there is no consideration whatsoever given to the issue of what location a user logs in from. Based on only the telephone number of a mobile phone it is not possible to simultaneously assure the certification and user identification certifying what location the user logged in from. More specifically, for a case in which a user logs in by operating an information terminal installed in a public place, Japanese Patent Laid-Open No. 11-027750 does not give consideration to assuring that the user is actually operating that information terminal.

In the environment described in Japanese Patent Laid-Open No. 11-027750, it is taken as a premise that a mobile terminal and a PC form a set. For example, it is a usage method in which a user visits an outside location with a mobile terminal and a PC, and connects to the user's in-company network from that outside location.

However, a case in which a user utilizes an information terminal in a public place is simply a case in which the user possesses only the user's own mobile terminal. For example, consider a case in which a user prints a document stored in a server through a printer that is installed in a convenience store. In order to assure the security of the print document in this case, it is necessary for the user to specify the location in which the printer is installed.

SUMMARY OF THE INVENTION

An object of the present invention is to enhance the reliability of certification processing by utilizing a telephone set ID service and enabling an assurance relating to the location in which a user carries out a certification operation.

According to one aspect of the present invention, there is provided a certification apparatus comprising: a display unit configured to display a telephone number at a predetermined timing in a certification procedure; an acquisition unit configured to acquire a telephone number of a caller from a incoming call signal for a call to a telephone number that is displayed by the display unit; and an execution unit configured to execute certification processing using a telephone number that is acquired by the acquisition unit.

Furthermore, according to another aspect of the present invention, there is provided a certification system configured to carry out a certification request from a terminal device to a server apparatus in a system in which communication is possible between the terminal device and the server apparatus, wherein the terminal device comprises: a display unit configured to display a telephone number at a predetermined timing in a certification procedure; an acquisition unit configured to acquire a telephone number of a caller from a incoming call signal for a call to a telephone number that is displayed by the display unit; and a transmission unit configured to transmit a telephone number that is acquired by the acquisition unit to the server apparatus, and wherein the server apparatus comprises a certification unit configured to execute certification processing based on a telephone number that was transmitted by the transmission unit.

Furthermore, according to another aspect of the present invention, there is provided a certification method, comprising: a display step for displaying a telephone number at a predetermined timing in a certification procedure; an acquisition step for acquiring a telephone number of a caller from a incoming call signal for a call to a telephone number that is displayed by the display step; and an execution step for executing the certification processing using a telephone number that is acquired in the acquisition step.

Furthermore, according to another aspect of the present invention, there is provided a certification method for carrying out a certification request from a terminal device to a server apparatus in a system in which communication is possible between the terminal device and the server apparatus, comprising: a display step in which the terminal device displays a telephone number at a predetermined timing in a certification procedure; an acquisition step for acquiring a telephone number of a caller from a incoming call signal for a call to a telephone number that is displayed in the display step; a transmission step for transmitting a telephone number that is acquired in the acquisition step to the server apparatus; and a certification step, at the server apparatus, for executing certification processing based on a telephone number that was transmitted in the transmission step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view that conceptually describes a connection relationship between a terminal device, a mobile phone and a server according to the embodiments;

DETAILED DESCRIPTION OF THE PREFERRED EMBODIMENTS

Preferred embodiments of the present invention will now be described in detail in accordance with the accompanying drawings.

Figure 1:
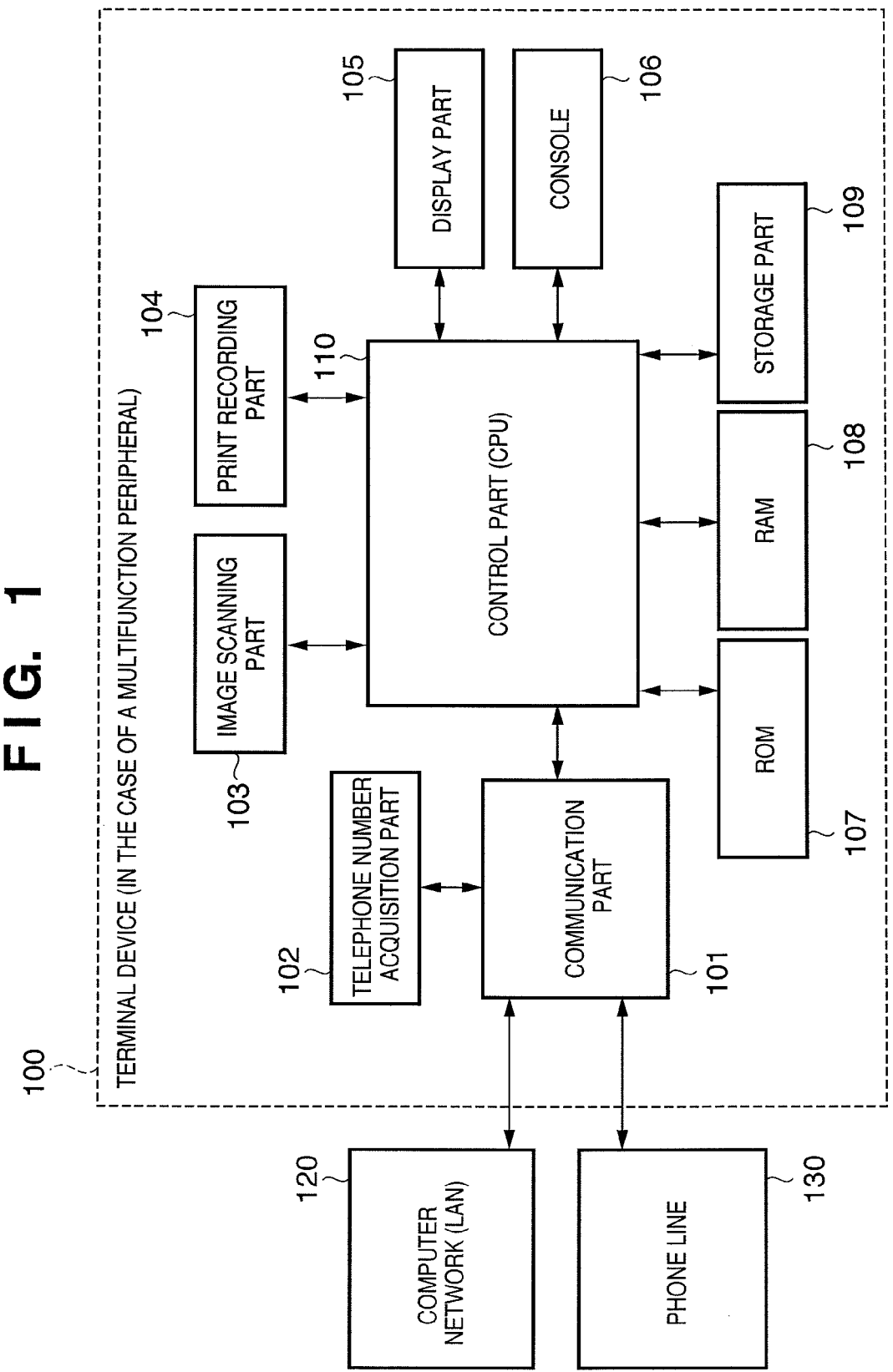
FIG. 1 is a block diagram showing an example of the internal configuration of a terminal device 100 according to the embodiments.

FIG. 1 is a block diagram showing an example of the internal configuration of a terminal device 100 according to the present embodiment. In FIG. 1, the terminal device 100 is a multifunction peripheral (MFP) equipped with an image scanning function and a recording function. A communication part 101 provides an interface for performing communication with an external device. The communication part 101 is equipped with an interface for connecting with a phone line 130, and an interface for connecting to a computer network 120 such as a LAN or the Internet. In this embodiment, the communication part 101 connects to the Internet via a LAN and performs certification processing with a predetermined server (information processing apparatus) on the Internet. Further, the communication part 101 sends and receives image data and other kinds of data to and from the server. A telephone number acquisition part 102 acquires a telephone number from a signal received by the communication part 101 through the phone line 130. According to this embodiment, a caller ID service is used and a telephone number notified by this service is acquired.

An image scanning part 103 optically scans an original and generates image data in order to send an original or copy an original. A print recording part 104 prints a copy or print image on a recording medium. A display part 105 displays various kinds of operation states, operation guides and statuses. A console 106 is equipped with various kinds of operation keys. By operating various keys, a user can, for example, set the number of copies to be printed by the print recording part 104, set the method for scanning an original with the image scanning part 103, or enter character information for certification by the above described server apparatus. In this connection, a configuration may be adopted in which a part or all of the display part 105 and the console 106 is realized by a touch panel.

In a ROM 107 are stored various programs to be executed by a control part 110. Various processing of the terminal device 100 that will be described referring to the flowcharts are implemented by execution of control programs stored in the ROM 107 by the control part 110. A RAM 108 stores various programs transferred from the ROM 107 or data transferred from a storage part 109. Further, one part of the RAM 108 is secured as a work area when control part 110 executes various programs. The storage part 109 is equipped with, for example, a hard disk, and it can store a large volume of data. The control part 110 is equipped with a CPU, and it performs various kinds of control and processing of various kinds of signals.

The computer network 120 is composed by a LAN and the Internet (hereunder, also referred to as "Internet 120"). A phone line 130 is a public line and it receives calls from mobile phones and the like.

FIG. 2 is a view that describes a connection relationship between the terminal device 100 and a server according to this embodiment. As shown in FIG. 2, the terminal device 100 can connect to a server 300 via the Internet (120). Image data is recorded in the server 300 as the object of a pull-print operation. As used herein, the term "pull-print" refers to a printing manner in which image data or document data that is stored in a server is acquired from the terminal device 100 that performs printing to thereby conduct printing. However, the present invention is not limited to a pull-print operation, and a printing manner in which data is sent to the terminal device 100 from a server may be employed. When the terminal device 100 performs pull-printing, the terminal device 100 acquires a desired image from the server 300 via the Internet, and prints out the image. In this connection, when the terminal device 100 logs into the server 300 to perform a pull-print operation, number notification by means of a call from the mobile phone 200 and key entry from the console 106 are used.

Figure 3A:
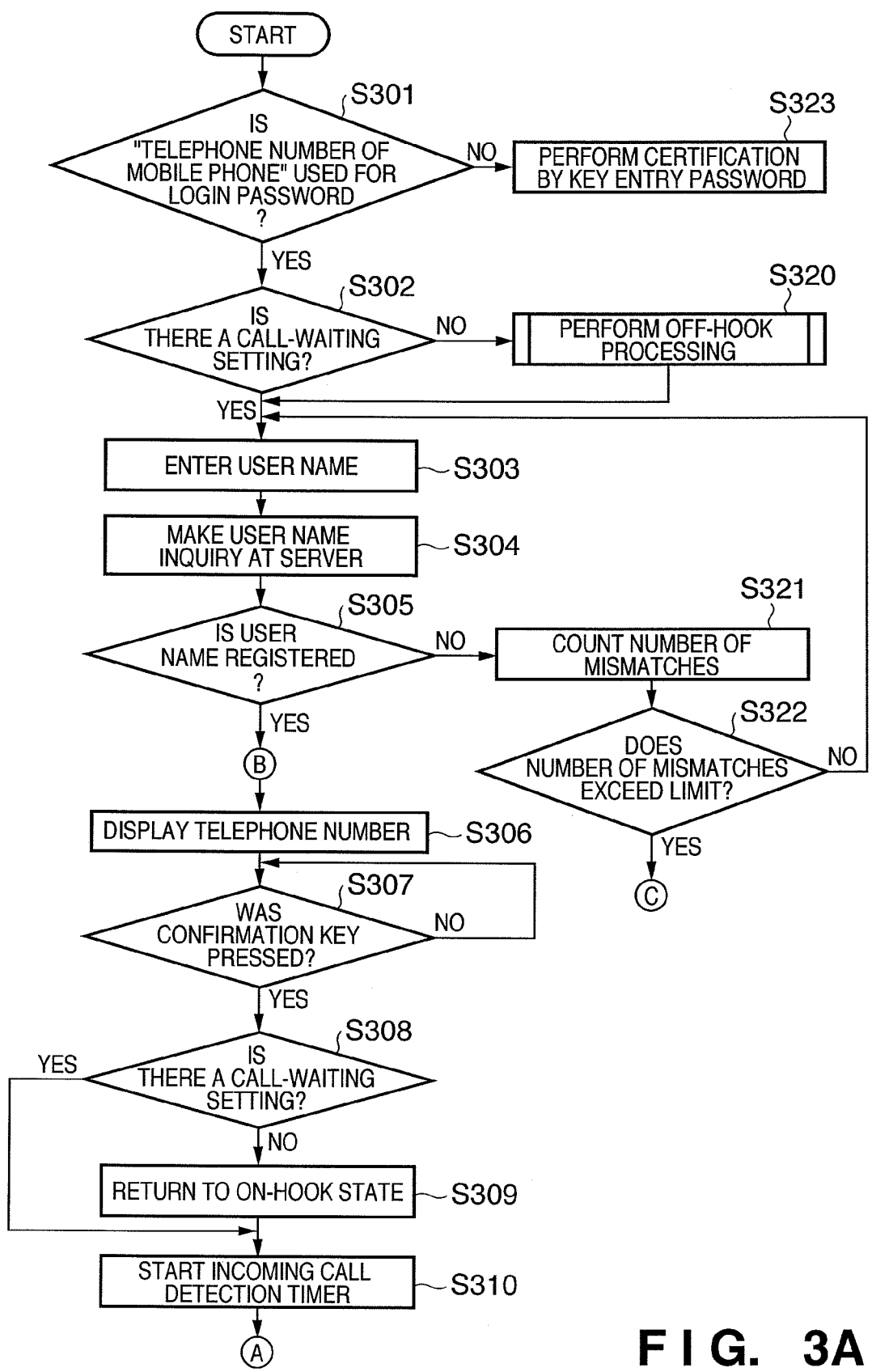
FIG. 3A and FIG. 3B are flowcharts for explaining certification processing according to the embodiments.
Figure 3B:
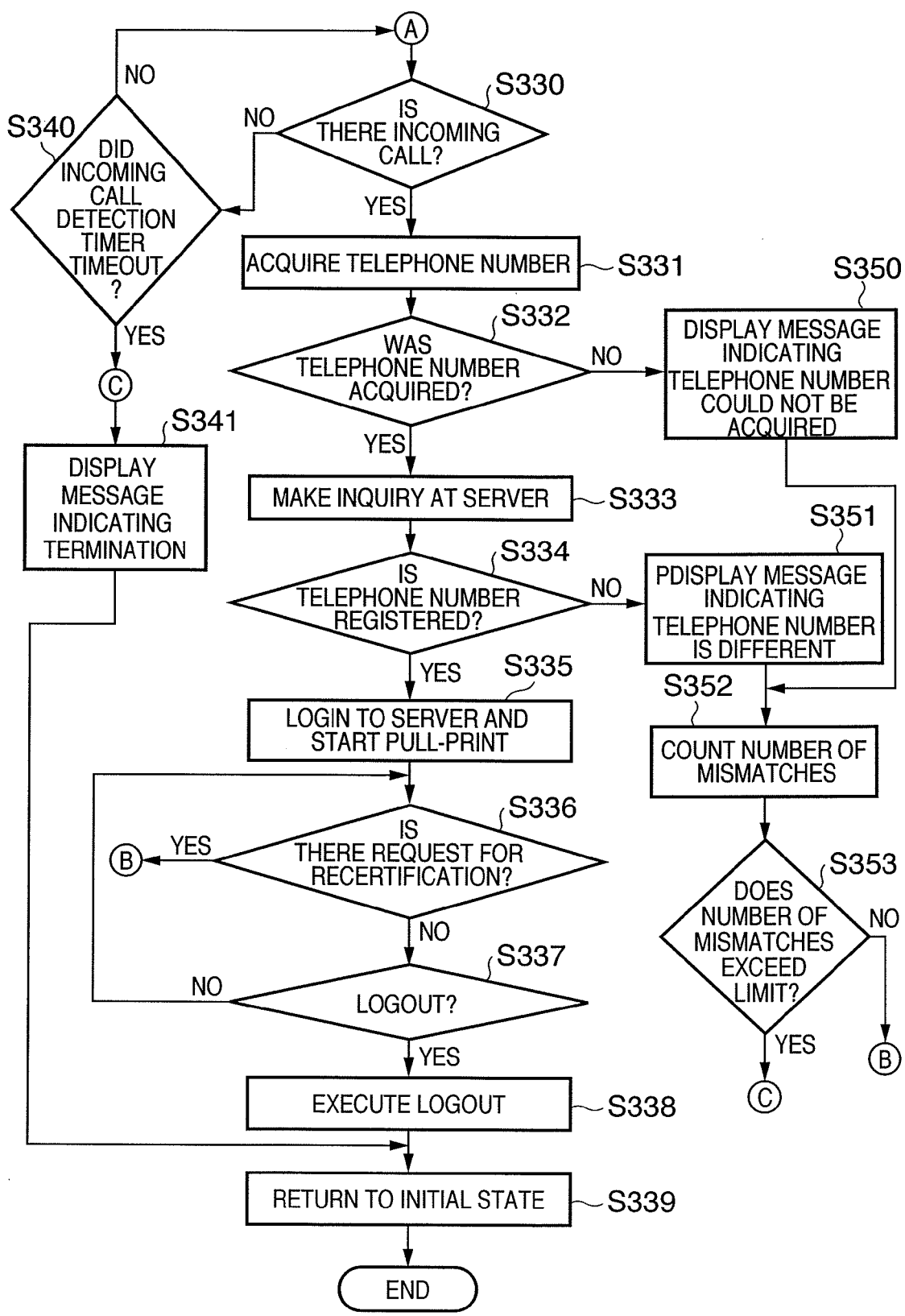
Figure 4:
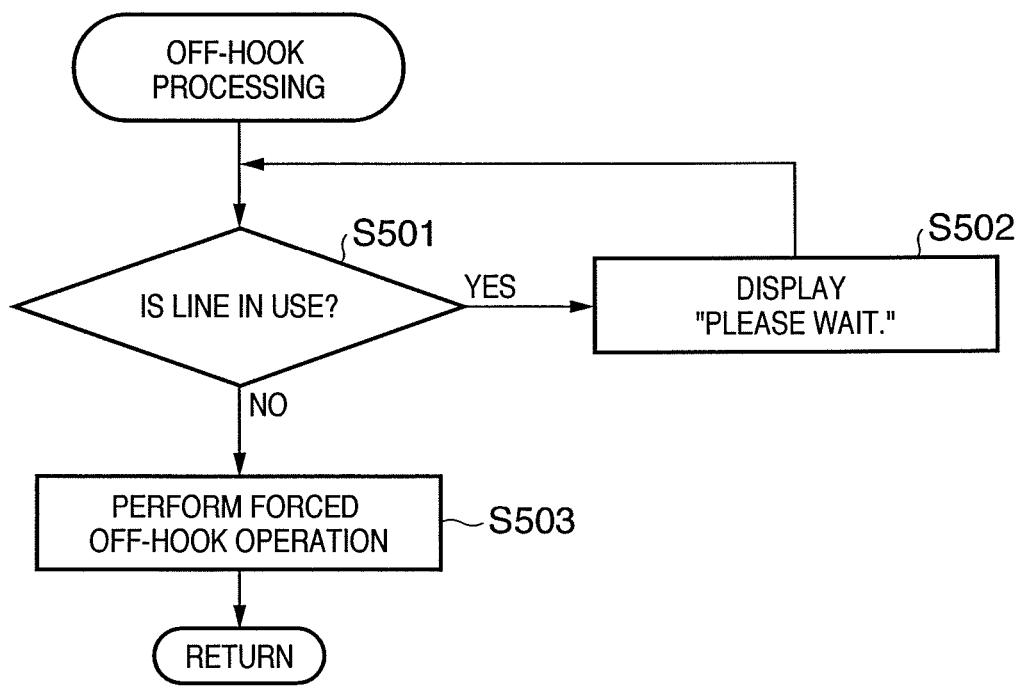
FIG. 4 is a flowchart for explaining off-hook processing according to the embodiments.
Figure 5:
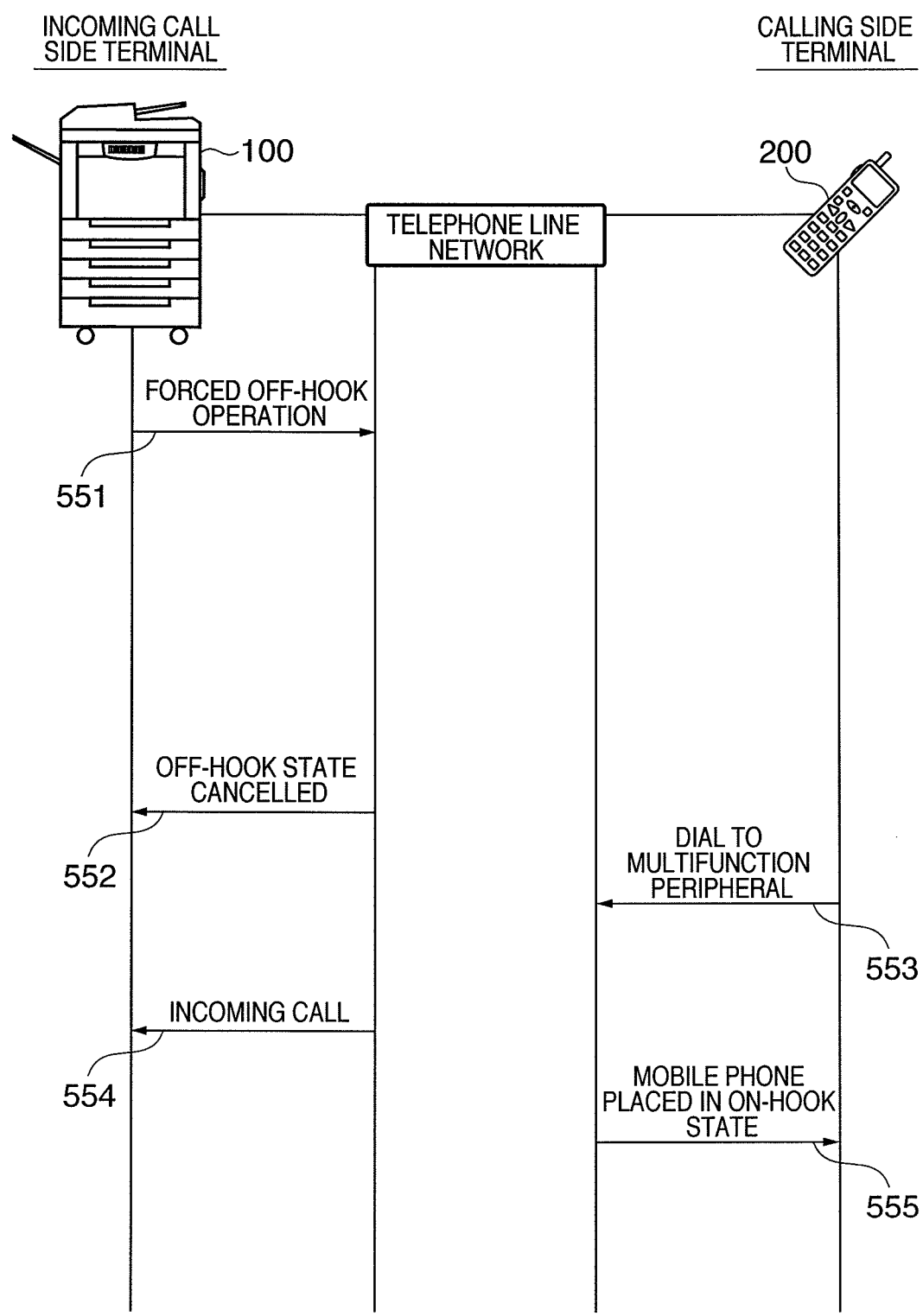
FIG. 5 is a state transition diagram in a case of line securement.
Figure 6:
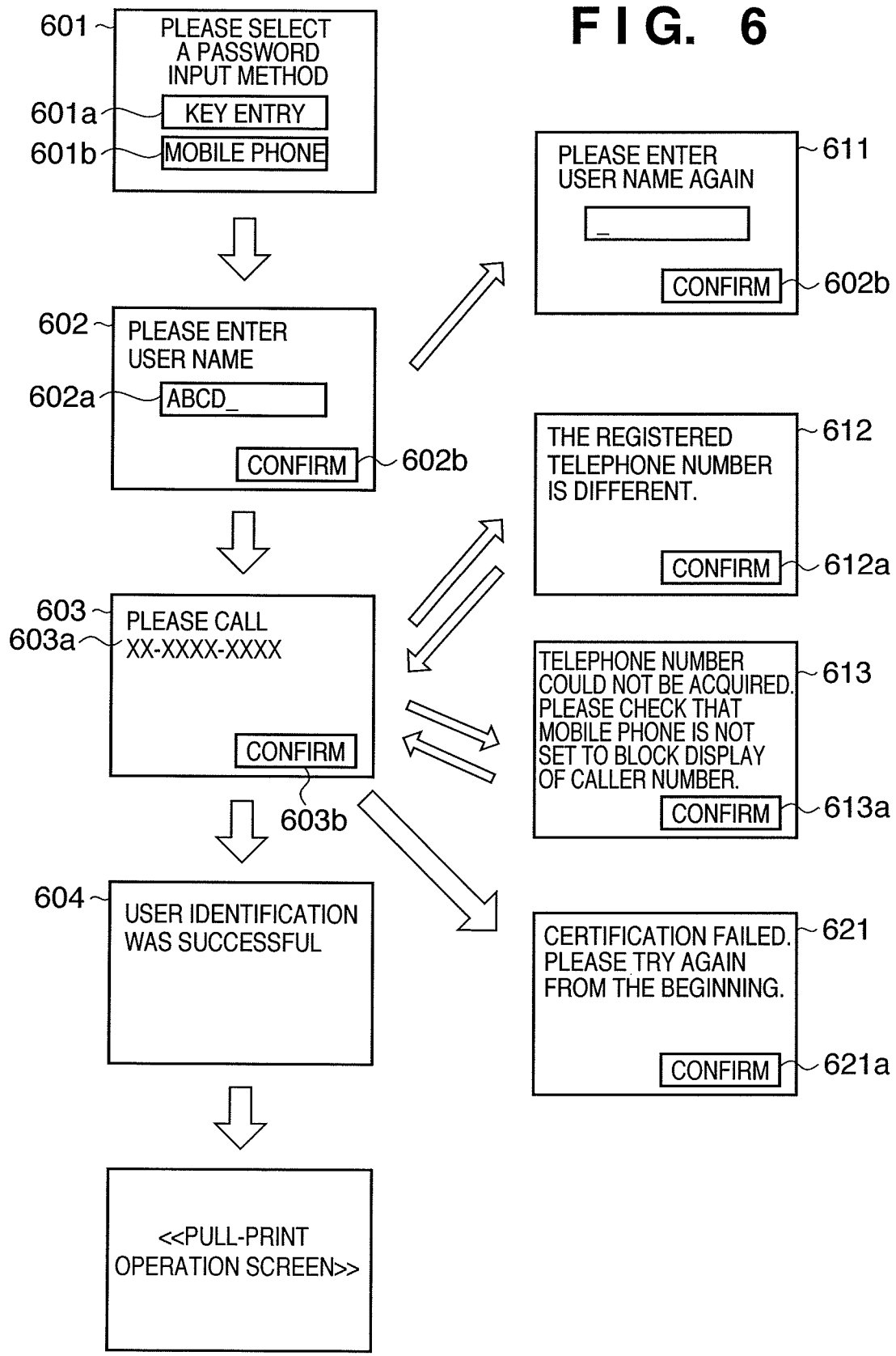
FIG. 6 is a view showing examples of screen displays for certification processing according to the embodiments.
Figure 9:
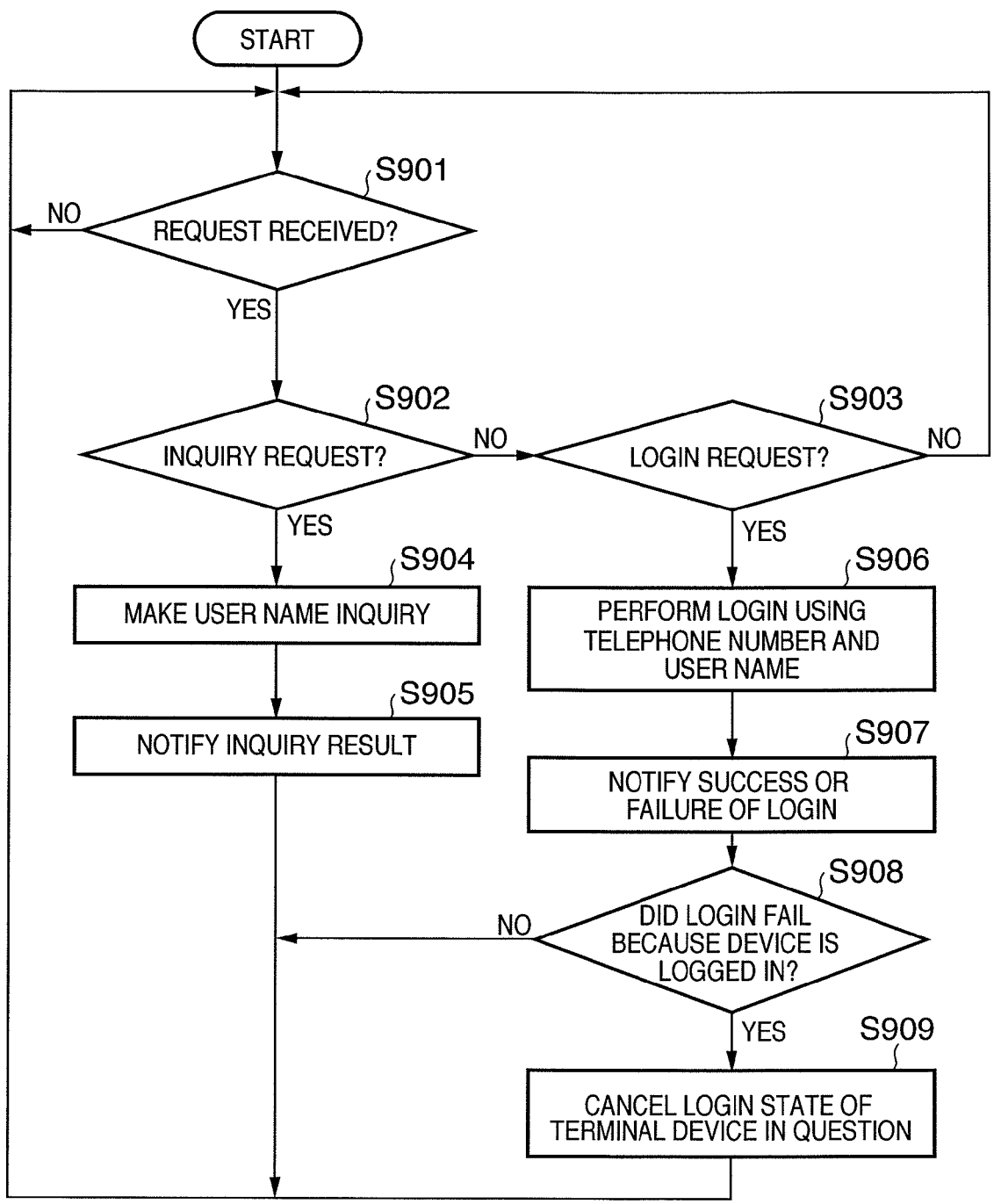
FIG. 9 is a flowchart for explaining certification processing in a server apparatus.

Hereunder, as an example of a certification operation of this embodiment, a case is described of performing a pull-print operation using a terminal device (multifunction peripheral) 100 that is installed in a convenience store or the like (terminal device 100 in a public environment). FIG. 3A and FIG. 3B are flowcharts for explaining a certification operation performed by the terminal device 100 according to this embodiment. FIG. 4 is a flowchart for explaining a line reservation operation at the terminal device 100 when a call-waiting setting that enables call waiting during line usage is not set. FIG. 5 is a view showing a state transition in a line reservation operation. FIG. 6 is a view showing display examples at each stage on the display part 105 of the terminal device 100 of this embodiment. Further, FIG. 9 is a flowchart illustrating an operation relating to a certification process in the server 300.

First, preprocessing will be described. The procedures or methods or the like used for this preprocessing may be of any kind.

For preprocessing, a user performs user registration at the server 300 using a personal computer or the like. As the result of user registration, the user name and telephone number of the mobile phone of the user in question are registered in the server 300. This registration information is, for example, held in the server 300 in the form of a registration table 300a as shown in FIG. 2. Further, data and the like which a user desires to output at a terminal device is stored in this server or another server.

When a user operates the console 106 of the terminal device 100 to select "pull-print", a screen 601 as shown in FIG. 6 is displayed on the display part 105. The display part 105 according to this embodiment is composed by a touch panel, and a user can perform a button operation by touching a key entry button 601a or a mobile phone button 601b on the screen 601 with a finger. By selecting the mobile phone button 601b, a certification mode is selected that uses the telephone number of the mobile phone as a login password. When this certification mode is selected, the process advances from step S301 to step S302. In step S302, the terminal device 100 determines whether a call-waiting setting has been made with respect to calls received from the phone line 130. When a call-waiting setting has not been made, the process advances to step S320 in order to secure a line to the terminal device 100 in question, and carries out off-hook processing. More specifically, the receipt of calls from another device is prevented by forcefully placing the terminal device 100 in an off-hook state. In this connection, although the term "off-hook" indicates a state in which the terminal device 100 is connected with a phone line, the method of placing the terminal device 100 in an "off-hook" state may be of any kind.

The process subsequently proceeds to step S303 in which a screen 602 is displayed to allow the user to enter a user name. This user name corresponds to a user name that was registered in the server 300 at preprocessing. The user name, for example, is composed by a combination of alphabetic characters and numerical characters. The user enters the user name using a ten-key pad that is provided on the console 106. The entered user name is displayed in a user name display region 602a. A configuration may also be adopted in which the ten keys are displayed on the display part 105 to allow the user to enter the user name from the touch panel. When a confirm button 602b is pressed after entering the user name, the process advances to step S304 in which the terminal device 100 sends the user name to the server 300 via the Internet 120 and requests an inquiry. In this connection, if a user name is not entered within a predetermined time, the process is terminated and the screen is returned to the initial state.

Meanwhile, as shown in FIG. 9, the server 300 is on standby for receipt of a request from the terminal device 100 (step S901). When the server 300 receives the inquiry request from the above described step S304, the process advances to step S904 through step S902 to perform an inquiry operation using the entered user name and the registration table 300a. More specifically, the server 300 determines whether or not the user name that was sent is registered in the registration table 300a. Next, in step S905 the server 300 notifies the determined result to the terminal device 100.

When the terminal device 100 receives a notification from the server 300 to the effect that the user name is a registered name, the process advances from step S305 to step S306. In step S306 the telephone number of the terminal device 160 in question is displayed to the user by a display 603a as shown on the screen 603 to prompt the user to make a phone call to the terminal device 100 in question from the user's mobile phone. Subsequently, in step S307, the terminal device 100 waits for the user to press a confirmation key 603b. When the confirmation key 603b is pressed, the process again branches in accordance with whether or not a call-waiting setting has been made. When a call-waiting setting has been made the process advances to step S310, in which an incoming call detection timer (fail-safe timer) is started to begin certification processing by the telephone number of the mobile phone. In contrast, when a call-waiting setting has not been made, the terminal device 100 entered an off-hook state in the above step S320. Accordingly, the process advances to step S309 to return the communication part 101 of the terminal device 100 to an on-hook state, and then proceeds to the above described step S310. In this connection, a configuration may also be adopted in which the processing of step S308 is performed immediately after the screen 603 was displayed, without waiting for the confirm button 603b to be pressed. When the incoming call detection timer starts in step S310, the process advances to step S330.

As described in the foregoing, by providing the confirm button 603b and step S307, the user can prepare the mobile phone 200 after viewing the display of the screen 603, and can then press the confirmation key 603b of the multifunction peripheral as a sign to indicate that the user has completed preparations for dialing with the mobile phone. When the confirm button 603b is not pressed within a period until a predetermined time lapses after display of the screen 603, the certification processing in question is forcefully terminated. As described in the foregoing, since operation of the terminal device 100 (multifunction peripheral) in front of the user and the telephone number certification cannot be done unless the user is in that place, it is possible to identify the user's location. That is, it is possible to determine that the user is definitely performing the certification operation in front of the terminal device 100.

In step S330, the terminal device 100 waits for an incoming call to the telephone number that was displayed in the above described step S306. When an incoming call is detected by the communication part 101, the process advances to step S331. In step S331, the telephone number acquisition part 102 analyzes a caller notification signal (for example, FSK: frequency shift keying) to acquire the telephone number. Naturally, a method for acquiring the telephone number of a caller is not limited to this.

When a telephone number was acquired, the process advances from step S332 to step S333, in which the acquired telephone number is sent to the server 300 to request login. The server 300 refers to the registration table 300a to perform certification and user login processing using the user name that was sent earlier and the telephone number that was sent in step S333. That is, as shown in FIG. 9, in the server 300, when a login request is received the process advances to step S906 through steps S901, S902 and S903. In step S906, login is attempted by comparing the telephone number and user name with the registration contents of the registration table 300a. Next, in step S907, the success or failure of the login is notified to the terminal device 100. Since the device is not logged in at this time, the process branches to NO at step S908. In step S334 the terminal device 100 determines whether or not certification was obtained from the server. More specifically, whether or not certification was obtained at this time is equivalent to whether or not the acquired telephone number is a registered number.

In step S333, only a telephone number may be sent to the server 300, or a user name and a telephone number may be sent as a pair to the server 300. When only a telephone number is sent, a user name that was received together with an inquiry request from that terminal device immediately prior thereto is held by the server 300 in association with the ID of the terminal device in question. Thereafter, when the server 300 receives a login request including only a telephone number, it acquires the user name that is being held in association with the ID of the terminal device that is the originator of the login request in question.

When certification was successful, that is, when the acquired telephone number was the number that was registered in association with the user name, the process advances from step S334 to step S335. In step S335, a screen 604 is displayed to notify the user that the user identification was successful and the environment switches to an environment that enables a pull-print operation. For example, a display screen is provided to the user to enable the user to specify data that is held in the server 300 and execute printing.

By contrast, in step S305, when the user name is not registered in the server 300 the process advances from step S305 to step S321. In step S321, the number of times that verification of the user name ended in a failure, i.e. the number of mismatches, is counted. Next, in step S322, if the number of mismatches is within a predetermined number the process returns to step S303 and, for example, a screen 611 is displayed to prompt entry of a user name again. When the user reenters a user name on this screen and presses the confirm button 602b, the enquiry processing of step S304 is executed again. When the number of mismatches exceeds the predetermined number in step S322, the process advances to step S341 to display a screen 621 indicating that certification failed. When the user presses the confirm button 621a, the certification processing in question ends.

When a call is received by the terminal device 100, in some cases a telephone number cannot be acquired in step S331 because the mobile phone 200 is set to caller ID blocking or the like. In such case, the process advances from step S332 to step S350. In step S350, a screen like that of screen 613 is displayed on the display part 105 to notify the user to the effect that a telephone number cannot be acquired and instruct the user to switch the setting of the mobile phone to a number notification state and make the call again. When the user presses the confirm button 613a, the process advances to step S352 to increase the count value for the number of mismatches by one. Next, the process advances to step S353 to determine whether or not the number of mismatches exceeds a predetermined number. If the number of mismatches is within the predetermined number, the process returns to step S306 to display the screen 603 to prompt the user to call the terminal device 100 again. When the number of mismatches exceeds the predetermined number, the process advances from step S353 to step S341 to display the screen 621 to notify the user that certification failed.

Further, when it was determined as a result of the inquiry at the server 300 (step S333) that the telephone number acquired by the terminal device 100 was not registered (when login failed), the process advances from step S334 to step S351. In step S351, for example, the screen 621 is displayed on the display part 105 to notify the user to the effect that the telephone number is different. When the user presses the confirm button 612a, the process advances to step S352 to increase the count value for the number of mismatches by one. Next, the process advances to step S353 to determine whether or not the number of mismatches exceeds a predetermined number. If the number of mismatches is within the predetermined number, the process returns to step S306 to display the screen 603 to prompt the user to call the terminal device 100 again. When the number of mismatches exceeds the predetermined number, the process advances from step S353 to step S341 to display the screen 621 to notify the user that certification failed.

In this connection, in step S341 a message is displayed to the effect that certification failed because the number of mismatches for the user name exceeded a predetermined number (S322), an incoming call detection timer timed out (S340), or the number of mismatches exceeded a predetermined number because a telephone number could not be acquired or the acquired telephone number is unregistered (S353). Accordingly, the screen 621 may indicate the reason for certification failure. For example, when step S341 is executed as a result of branching from step S353, a message "Certification failed due to timeout of incoming call detection timer. Please try again from the beginning." is displayed on the screen 621.

Further, a configuration may also be adopted which automatically returns the display contents of the display part 105 to the initial screen after the notification as shown on the screen 621 is displayed for a predetermined time. By adopting this configuration, the display returns to the initial screen even if the user forgets to press the confirm button 621*a*, and no sense of unease will be generated for the next user.

According to this embodiment, in order to further enhance security even after login, certification by mobile phone is performed at a predetermined timing (for example, every time a predetermined number of printed sheets are output). More specifically, in step S336 of FIG. 3B, in order to enhance security it is determined whether or not it is necessary to perform certification again, and when it is determined that recertification is necessary, the process returns to step S306. As a result, the screen 603 of FIG. 6 is displayed to prompt the user to call the terminal device 100 using the mobile phone. The pull-print process is then suspended until the new certification is successful. If certification fails, the pull-print process is cancelled at that time. Further, when logout is specified, the process advances from step S337 to step S338 to terminate the pull-print operation and logout from the server 300 to end the present process. At that time, in the server apparatus 300, the process branches to YES at step S908, and in step S909 the login state of the terminal device 100 in question is cancelled.

In this connection, for the above process, it will be understood that a configuration may be adopted that strengthens security by use of appropriate encryption for communication with the server 300.

Next the off-hook processing of step S320 will be described using FIG. 4 and FIG. 5. An object of the off-hook processing is to effectively secure a line at the time of certification processing with respect to a line for which a call-waiting setting during line usage is not made. In step S501, it is determined whether or not the line is in use at the communication part 101. When the line is in use, certification cannot be performed until the line becomes vacant. Accordingly, the process advances to step S502 to display a message on the display part 105 to cause the user to wait until the line becomes vacant. For example, a message "Please wait." is displayed. When the line is vacant or the line enters a vacant state, the process advances to step S503. In step S503, the communication part 101 is forcefully placed in an off-hook state so that another incoming call is not received during the certification operation.

In step S503, a forced off-hook operation (as denoted by reference numeral 551 in FIG. 5) is executed at the terminal device 100 as shown in FIG. 5. As described above, this is done to secure the phone line of the terminal device 100 at an early stage and reject other incoming calls, in order to perform certification using the mobile telephone number. Thereafter, when a user name that is registered in the server 300 is entered, the user is prompted to make a call to the terminal device 100 by the screen 603 of FIG. 6. When the user has prepared the mobile phone and completed dialing preparations, the user presses the confirm button 603*a* as a sign to indicate that dialing preparations are completed. When the confirm button 603*a* is pressed, the off-hook state is cancelled (as denoted by reference numeral 552 of FIG. 5) and the terminal device 100 switches to an on-hook state (step S309). The user then dials the terminal device 100 from the mobile phone 200 (as denoted by reference numeral 553 of FIG. 5). The terminal device 100 acquires the telephone number from the received signal (as denoted by reference numeral 554 of FIG. 5), and carries out certification using this telephone number.

If the user can hear a ring tone from the receiver of the mobile phone 200, it indicates that the call is being received by the terminal device 100. Accordingly, upon confirming the ring tone the user places the mobile phone in an on-hook state (as denoted by reference numeral 555 of FIG. 5).

The foregoing is a detailed description of the certification processing according to this embodiment.

In this connection, although the message "Please wait." was displayed on the display part 105 in step S502 when the line was in use in step S501, the present invention it not limited thereto. For example, when it is determined in step S501 that the phone line is in use, a function may be provided that displays a message indicating the line is in use and also reserves the line so that the user can have priority to use the line as soon as the line becomes vacant. Processing for this kind of reservation is described hereunder referring to FIG. 7 and FIG. 8.

Figure 7:
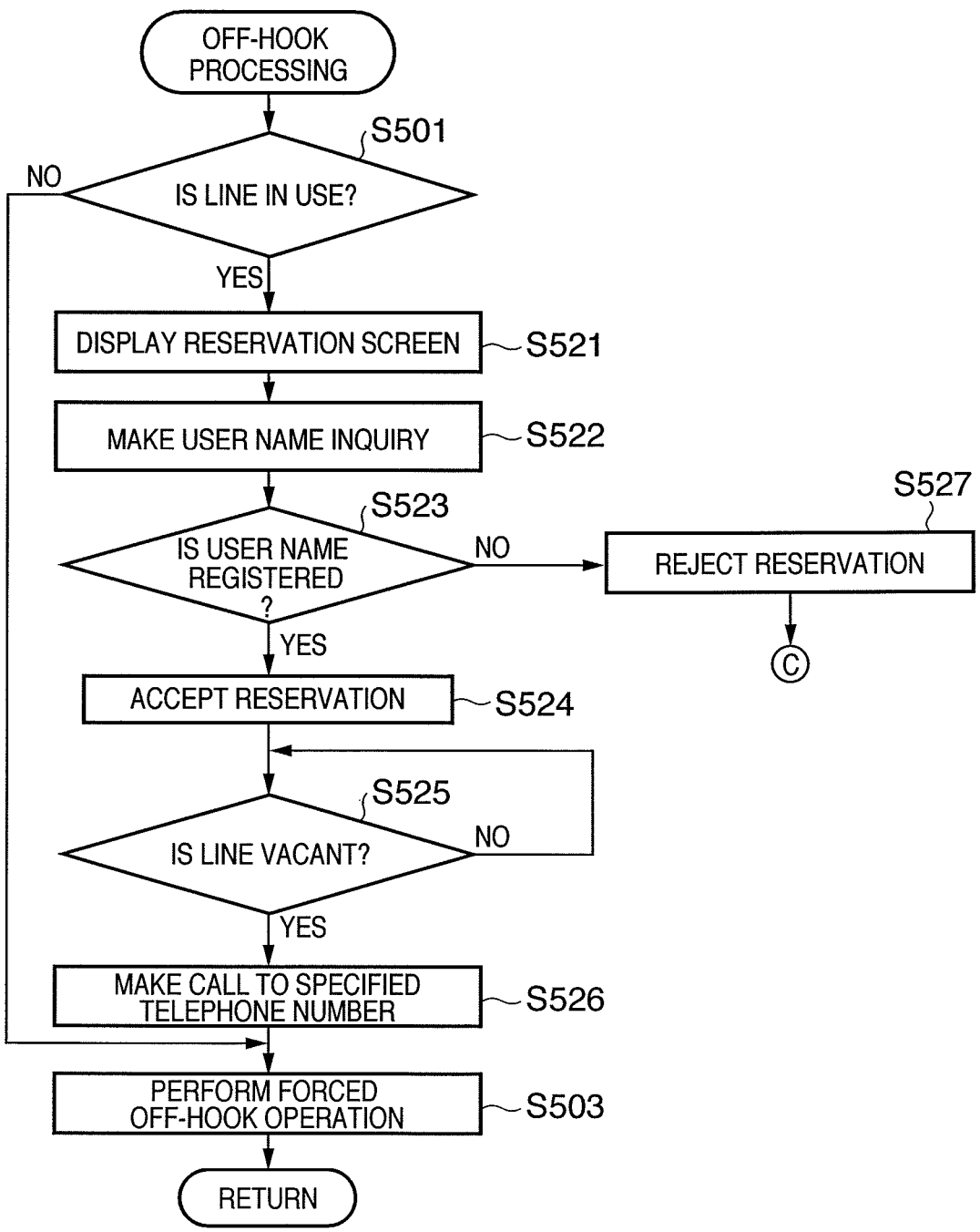
FIG. 7 is a flowchart for explaining reservation processing.
Figure 8:
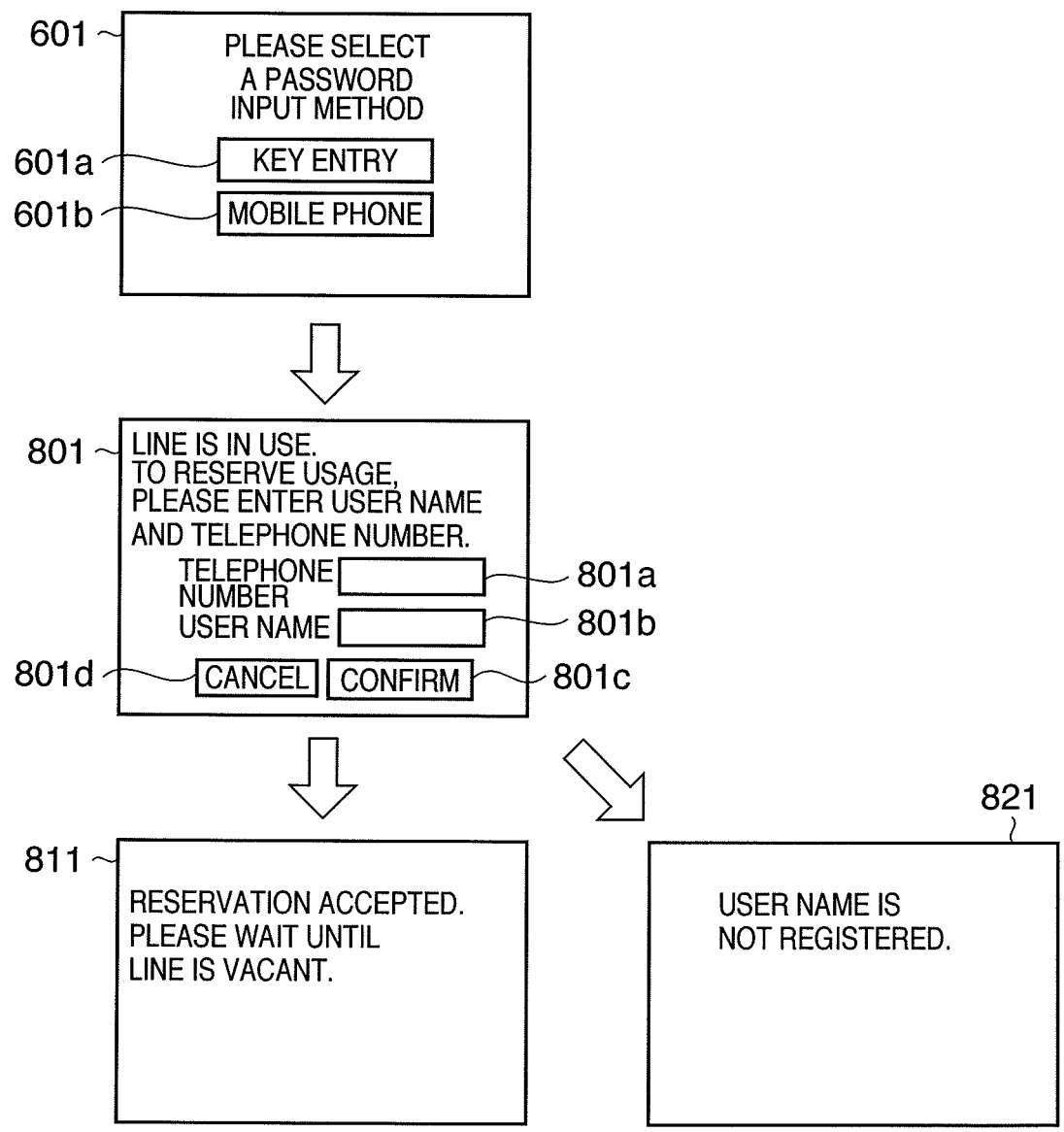
FIG. 8 is a view showing examples of screen displays for reservation processing.

FIG. 7 is a flowchart for describing off-hook processing that includes reservation processing. The processing of FIG. 7 is an alternative to the off-hook processing illustrated in FIG. 4. FIG. 8 is a view showing transition examples of the screen at the time of reservation processing. As described using FIG. 3A, when a mobile phone button 601*b* of a screen 601 of FIG. 8 is pressed, when a call-waiting setting has not been made at the terminal device 100 in question, the off-hook processing (FIG. 7) of step S320 is initiated.

In FIG. 7, when it is determined in step S501 that the line is in use, the process advances to step S521. In step S521, an interface (screen 801) is provided using the display part 105 to allow the user to enter a user name and a telephone number of a mobile phone. The user enters a telephone number in a telephone number entry field 801*a* and a user name in a user name entry field 801*b* of the screen 801, and then presses a confirm button 801*c*. When the confirm button 801*c* is pressed, in step S522, similarly to step S304, the user name that was entered in the user name entry field 801*b* is notified to the server 300 through the Internet 120 to perform an inquiry. Upon receiving the inquiry result from the server 300, if the user name is not registered the process advances to step S527 and, for example, a screen 821 is displayed to refuse the reservation.

In contrast, when it is confirmed that the user is registered, the process advances to step S524 to display a screen 811 on the display part 105 and accept the reservation. The terminal device 100 waits for a predetermined time to lapse after displaying the screen 821 or screen 811, and then returns the display of the display part 105 to a standby state. Thereafter, as soon as the line is vacant, the communication part 101 of the terminal device 100 makes a phone call to the mobile phone to execute the processing of step S303 and thereafter (steps S525 and S526). More specifically, the terminal device 100 notifies the user to the effect that the line was secured by making a call to the telephone number that was entered in the telephone number entry field 801a. For example, the terminal device 100 makes a call of a predetermined number of rings, disconnects the line, and the process then advances in that state to step S503 to put the terminal device in a forced off-hook state. At this time, if the user has placed the mobile phone in an off-hook state for the call in question, the terminal device 100 may be configured to make an announcement to notify the user to the effect that the line is vacant. The process then advances to step S303 to enable the above described login operation. Thus, login can be performed by the same operation as normal login when starting certification again.

Further, a configuration is preferably adopted whereby, at the time that certification ends normally or ends abnormally at the terminal device 100, an acquired telephone number or information entered by the user for the purpose of certification is erased from the internal memory.

According to the above embodiment, as the result of entering a user name at the time of a login operation, a message is displayed that prompts the user to make a phone call to the terminal device 100, and the user is requested to make a phone call in accordance with this message. For example, when a user name that was entered in the terminal device 100 is sent to the server 300 and it is determined that the user name is registered in the server 300, the user is requested to make a call from the user's mobile phone. Thus, since the user is requested to make a call at a predetermined timing during a series of certification procedures, it is possible to effectively provide the condition that the user must be present in that location. Therefore, since operation of the terminal device 100 and telephone number certification can not be done unless the user is present at that location (location of the terminal device 100), it is possible to simply identify the location of the user and perform certification in a short time with respect to certification processing by the information terminal 100 that is used by an unspecified large number of users. Further, since the telephone number that is used for certification is sent from a central telephone exchange, the possibility of falsification or masquerading is eliminated, and certification that has high reliability and a simple configuration can thus be realized.

Further, by making the communication part 101 support an interruption call function, confirmation of a number notification can be performed at login even when the line is in use. Accordingly, it is possible to eliminate a waiting time caused by the line being in use due to an incoming call from another device. Further, when the communication part 101 does not support an interruption call function, in response to a predetermined operation of the terminal device, the terminal device is forcefully put into an off-hook state from a state in which the line is not being used, to thereby block incoming calls from other parties. It is thus possible to reduce the possibility of a reception operation that will interfere with certification, such as a FAX reception, until the certification is completed. More specifically, since the possibility of the line of the terminal device 100 being occupied by an incoming call from another party is reduced to the utmost, login can be performed in a short time. In this connection, in the above embodiment a return to an on-hook state is carried out in accordance with the performance of a predetermined entry operation by the user on the display part 105/console 106. It is therefore possible for the user to return the terminal device to an on-hook state when preparations are completed for dialing from the mobile phone, and thus the forced off-hook state can be continued as long as is appropriate.

Further, according to the above embodiment, the user is prompted to make a call from the mobile phone at irregular intervals after login also, and certification is performed using the telephone number acquired from the received call. Thus, by requesting an operation that can only be complied with if the user is present in front of the information terminal and repeating certification, it is possible to effectively prevent unauthorized use and enhance reliability still further.

Further, although the above embodiment described the case of certification processing for a login to a server apparatus 300 from the terminal device 100, the above described certification processing can also be used for certification to allow a user to log into the terminal device 100 itself. In this case, the terminal device 100 performs the inquiry processing and login processing that was performed by the server 300. Further, notification of certification information (user name or telephone number) to the server 300 through the computer network 120 is unnecessary. The terminal device 100 is also not limited to a MFP, and any kind of information processing apparatus can be applied as the terminal device 100.

Although according to the above embodiment a user name and a telephone number were registered beforehand in the server 300, it is also possible to further register a password that corresponds to the user name and the telephone number.

In that case, the user enters a password together with a user name into the terminal device 100 in step S303 of FIG. 3A. The server 300 uses the entered user name and password to determine whether or not the user is a previously registered user. This configuration makes it possible to ensure a still higher level of security.

Further, although the above embodiment described one example of this invention using the relationship between the server 300 that holds certification information and the terminal device 100, the configuration of this invention is not limited thereto. For example, a server for certification and a server that holds document data may be separately provided as servers. A configuration may also be adopted in which the server 300 of this embodiment is provided as a certification part inside the terminal device. In this case, the invention can be implemented by the certification part inside the terminal device having the same information as the above described server 300.

In this connection, in the above embodiment, the terminal device 100 makes an inquiry with the server 300 regarding the entered user name, and the server 300 that received the inquiry used registration information to determine whether or not the user name equals a registered user name. When the user name equals a registered name, the server 300 sends information to the effect that the user name matched, that is, information for carrying out the subsequent processing (display of the unique telephone number of the terminal device 100) to the terminal device 100.

However, when a user name and a user name that was sent from the terminal device 100 matched at the server 300, the server 300 may also send to the terminal device 100 a telephone number that corresponds to the user name that is being registered for the terminal device 100.

In this case, upon receiving the telephone number from the server 300, the terminal device 100 stores the number in a predetermined storage area. Thereafter, similarly to the above described embodiment, the telephone number of the terminal device 100 is displayed to the user, and the user's mobile telephone number is acquired when the user makes a call to the displayed telephone number. Thereafter, the terminal device 100 determines whether or not the acquired mobile telephone number matches the registered telephone number that was sent from the server 300 and stored in the terminal device 100.

If the determination result shows that the registered telephone number that was stored and the received telephone number match, it is determined within the terminal device 100 that the user certification was successful. The terminal device 100 then notifies the server 300 to the effect that certification was successful, whereby the server 300 permits login of the user.

According to the present configuration, it is no longer necessary for the received telephone number to be notified from the terminal device 100 to the server 300 to perform certification processing at the server 300, and thus user certification processing can be implemented smoother and more swiftly.

In the above embodiment, a configuration is employed in which a unique telephone number of the terminal device 100 is displayed in step S306, and the user makes a call to that telephone number. However, the telephone number displayed by the terminal device 100 may be a telephone number of the server 300.

That procedure is described hereunder.

First, steps S301 to S305 of FIG. 3A are the same as in the above described embodiment. In step S306, a unique telephone number of the server 300 is employed as the telephone number to be displayed. In this case, it is assumed that the server 300 has a telephone function that utilizes a public line. The telephone number of the server 300 may be stored in advance in the terminal device 100 or the telephone number of the server 300 may be sent from the server 300 to the terminal device 100 at the time a user name inquiry was made from the terminal device 100.

Next, in step S307, the user presses a confirm button on the screen and calls the telephone number of the server 300 that was displayed on the screen of the terminal device 100. When the confirm button is pressed, the terminal device 100 notifies the server 300 to the effect that the user pressed the confirm button. Upon receiving the notification, the server 300 executes processing equivalent to that of steps S308, S309, and S310.

Next, in step S330 shown in FIG. 3B, the server 300 determines whether or not a call was received. When a call was received, the server 300 acquires the telephone number in step S331. Subsequently, in step S334, the server 300 determines whether or not the telephone number that was acquired in step S331 matches a telephone number associated with the user name that was previously registered. In this connection, step S333 is omitted from this configuration.

In step S334, when it is determined that the telephone numbers match, the server 300 notifies the terminal device 100 to the effect that the certification processing was successful, and also permits login of the user.

Thereafter, in step S335, the user can perform processing to print out a document or the like that the user stored in the server 300, in a similar manner to the embodiment described above.

As described in the foregoing, by employing a telephone number of the server 300 as the telephone number that is displayed on the terminal device 100, communication relating to certification processing can be made simpler than in the above described embodiment, enabling user certification to be carried out smoothly and swiftly.

The feature of this modification example is that the telephone number of the server performing certification is displayed on the display part of the terminal device. In order to display the telephone number of the server, it is necessary for the user to enter a user name at the terminal device. It is therefore possible for the server to determine that the user is definitely present in the vicinity of the terminal device.

Note that the invention may also be accomplished by supplying a program code (a program code corresponding to the flowcharts illustrated in the drawings according to the embodiments) of software which realizes the functions of the above described embodiments directly or indirectly to a system or apparatus, reading the supplied program code with a computer of the system or apparatus, and then executing the program code.

Accordingly, since the functional processes of the present invention are implemented by computer, the program code itself installed in the computer also implements the present invention. In other words, the claims of the present invention also cover a computer program for the purpose of implementing the functional processes of the present invention.

In this case, so long as the system or apparatus has the functions of the program, the program may be executed in any form, e.g., as object code, a program executed by an interpreter, or script data supplied to an operating system.

Examples of recording media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded from the website to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing based on instructions of the program.

Furthermore, after the program read from the recording medium is written to a function expansion board inserted into the computer or to a memory provided in a function expansion unit connected to the computer, a CPU or the like mounted on the function expansion board or function expansion unit may perform all or a part of the actual processing based on instructions of the program so that the functions of the foregoing embodiments can be implemented by this processing.

According to the present invention, the reliability of certification processing is enhanced by utilizing a telephone set ID service and also obtaining an assurance regarding the location of a user performing a certification operation.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-115907, filed on Apr. 13, 2005, which is hereby incorporated by reference herein in its entirety.

What is claimed is:

1. A certification apparatus, having an image scanning function and a print recording function, said apparatus comprising:
an input unit configured to input a user name through an operation unit of said apparatus;
an inquiring unit configured to execute inquiry processing for determining whether or not the user name input by the input unit has been registered;
a display unit configured to display, on a display portion of said apparatus, a telephone number in a case where a result of the inquiry processing indicates that the user name has been registered;
an acquisition unit configured to acquire a telephone number of a mobile phone of a caller from an incoming call signal for a call to the telephone number that is displayed by the display unit; and
an execution unit configured to execute certification processing using the telephone number that is acquired by the acquisition unit.

2. The apparatus according to claim 1,
further comprising a user information acquisition unit configured to acquire identification information of a user,
wherein the execution unit executes the certification processing using a telephone number that is acquired by the acquisition unit and the identification information that is acquired by the user information acquisition unit.

3. The apparatus according to claim 2,
further comprising a determination unit configured to determine whether or not identification information that is acquired by the user information acquisition unit is registered,
wherein the display unit displays a telephone number in a case where the determination unit determines that the identification information is information that is registered.

4. The apparatus according to claim 1,
wherein the apparatus has an interruption call function that can receive another incoming call even when a phone line is in use, and acquisition of a telephone number by the acquisition unit using the interruption call function is possible even when the phone line is in use.

5. The apparatus according to claim 1,
further comprising a confirmation unit configured to activate the display unit, the acquisition unit and the execution unit at a predetermined timing after certification by the execution unit is successful, and confirm continuation of a certification state.

6. The apparatus according to claim 1,
wherein the execution unit sends a telephone number that is acquired by the acquisition unit to an external device for certification.

7. The apparatus according to claim 1,
further comprising a switching unit configured to switch to an off-hook state a line corresponding to a telephone number that is displayed by the display unit, for a predetermined period that includes display of the telephone number by the display unit from the start of the certification procedure.

8. The apparatus according to claim 7,
wherein the switching unit switches the line to an on-hook state when the user performs a predetermined entry operation within the predetermined period.

9. The apparatus according to claim 7,
wherein the switching unit provides an interface to allow entry of a telephone number when the apparatus is already using a line when the switching unit attempts to execute a switch to an off-hook state, and
further comprises a unit configured to make a call to a telephone number that is entered using the interface when the line becomes vacant.

10. The apparatus according to claim 1,
wherein the acquisition unit has a unit configured to instruct a user to make a call again in a number notification state when the incoming call signal is a signal from a call that does not display a number.

11. The apparatus according to claim 1, wherein the predetermined timing begins when it is confirmed that a user name input to the apparatus is a registered name.

12. A certification system configured to carry out a certification request from a terminal device having an image scanning function and a print recording function to a server apparatus in a system in which communication is possible between the terminal device and the server apparatus,
wherein the terminal device comprises:
an input unit configured to input a user name through an operation unit of the terminal device;
an inquiring unit configured to execute inquiry processing for determining whether or not the user name input by the input unit has been registered;
a display unit configured to display, on a display portion of the terminal device, a telephone number in a case where a result of the inquiry processing indicates that the user name has been registered;
an acquisition unit configured to acquire a telephone number of a mobile phone of a caller from an incoming call signal for a call to the telephone number that is displayed by the display unit; and
a transmission unit configured to transmit the telephone number that is acquired by the acquisition unit to the server apparatus,
and wherein the server apparatus comprises a certification unit configured to execute certification processing based on a telephone number that was transmitted by the transmission unit.

13. The system according to claim 12,
further comprising, in the terminal device, a user information acquisition unit configured to acquire identification information of a user,
wherein the transmission unit transmits a telephone number that is acquired by the acquisition unit and the identification information that is acquired by the user information acquisition unit to the server apparatus; and
the certification unit performs certification processing using the telephone number and the identification information.

14. The system according to claim 13,
further comprising a determination unit configured to transmit the identification information that is acquired by the user information acquisition unit to the server apparatus using the transmission unit and determine whether or not the identification information is registered in the server apparatus,
wherein, when the determination unit determines that the identification information is registered, the display unit displays a telephone number.

15. The system according to claim 12, wherein the predetermined timing begins when it is confirmed that a user name input to the terminal device is a registered name.

16. A certification method, of a certification apparatus having an image scanning function and a print recording function, said method comprising:
- an input step for inputting a user name through an operation unit of said apparatus;
- an inquiring step for executing inquiry processing for determining whether or not the user name input in the input step has been registered;
- a display step for displaying, a display portion of said a apparatus, a telephone number in a case where a result of the inquiry processing indicates that the user name has been registered;
- an acquisition step for acquiring a telephone number of a mobile phone of a caller from an incoming call signal for a call to the telephone number that is displayed by the display step; and
- an execution step for executing the certification processing using the telephone number that is acquired in the acquisition step.

17. A computer-readable memory that stores a control program for causing a computer to execute a certification method according to claim 16.

18. The method according to claim 16, wherein the predetermined timing begins when it is confirmed that a user name input to the apparatus is a registered name.

19. The method according to claim 18, wherein the predetermined timing ends when a predetermined amount of time lapses after the telephone number of the certification apparatus is displayed.

20. A certification method for carrying out a certification request from a terminal device having an image scanning function and a print recording function to a server apparatus in a system in which communication is possible between the terminal device and the server apparatus, comprising:
- an input step in which the terminal device inputs a user name through an operation unit of said terminal device;
- an inquiring step in which the terminal device executes inquiry processing using the server apparatus for determining whether or not the user name input in the input step has been registered,
- a display step in which the terminal device displays, on a display portion of said terminal device, a telephone number in a case where a result of the inquiry processing indicates that the user name has been registered;
- an acquisition step for acquiring a telephone number of a mobile phone of a caller from an incoming call signal for a call to the telephone number that is displayed in the display step;
- a transmission step for transmitting the telephone number that is acquired in the acquisition step to the server apparatus; and
- a certification step for, at the server apparatus, executing certification processing based on a telephone number that was transmitted in the transmission step.

21. The method according to claim 20,
further comprising a user information acquisition step for acquiring identification information of a user at the terminal device,
wherein the transmission step transmits a telephone number that is acquired in the acquisition step and the identification information that is acquired in the user information acquisition step to the server apparatus, and
the certification step performs certification processing using the telephone number and the identification information.

22. A computer-readable memory that stores a control program for causing a computer to execute a certification method according to claim 20.

23. The method according to claim 20, wherein the predetermined timing begins when it is confirmed that a user name input to the terminal device is a registered name.

24. The method according to claim 23, wherein the predetermined timing ends when a predetermined amount of time lapses after the telephone number of the terminal device is displayed.

\* \* \* \* \*